United States Patent
Tran

(10) Patent No.: US 6,545,837 B1
(45) Date of Patent: Apr. 8, 2003

(54) METHOD AND APPARATUS FOR SERVO CONTROLLED AZIMUTH DATA RECORDING

(75) Inventor: Hung T. Tran, Woodbury, MN (US)

(73) Assignee: Imation Corp., Oakdale, MN (US)

( * ) Notice: Subject to any disclaimer, the term of this patent is extended or adjusted under 35 U.S.C. 154(b) by 0 days.

(21) Appl. No.: 09/468,441

(22) Filed: Dec. 21, 1999

(51) Int. Cl.$^7$ .............................................. G11B 5/584
(52) U.S. Cl. .................................... 360/77.12; 360/76
(58) Field of Search ........................ 360/76, 63, 77.12

(56) References Cited

U.S. PATENT DOCUMENTS

| | | | | |
|---|---|---|---|---|
| 5,132,861 A | * | 7/1992 | Behr et al. ................... 360/121 |
| 5,371,638 A | * | 12/1994 | Saliba ....................... 360/77.12 |
| 6,141,174 A | * | 10/2000 | Judge et al. .................. 360/76 |
| 6,188,532 B1 | * | 2/2001 | Albrecht et al. .............. 360/63 |

* cited by examiner

Primary Examiner—David Hudspeth
Assistant Examiner—Mitchell Slavitt
(74) Attorney, Agent, or Firm—Eric D. Levinson

(57) ABSTRACT

A system for increasing areal recording density in linear magnetic recording systems employs a continuous servo track and an azimuth recording technique. The system comprises multiple motors that displace parallel read/write heads at supplementary angles to the servo track when the head is positioned over adjacent data tracks. The resultant tracks may be very closely spaced together without loss of accurate tracking.

9 Claims, 2 Drawing Sheets

METHOD AND APPARATUS FOR SERVO CONTROLLED AZIMUTH DATA RECORDING

FIELD OF THE INVENTION

This invention concerns techniques for increasing areal recording density in linear magnetic recording systems.

BACKGROUND OF THE INVENTION

There are two basic approaches to increasing areal data recording density. The first is to increase bit density, and the second is to increase track density. Continuous track following servo schemes, physically narrower data tracks, or both increase track density in linear recording systems (such as those using flexible magnetic tape as the recording medium). The problem with physically narrower data tracks is that they require physically narrower recording gaps, which produce smaller signal amplitudes. At some point, the signals are too small to be decreased further without loss of signal.

One approach to increasing track density is azimuth recording, in which adjacent tracks are recorded by recording gaps slanted relative to each other. The signals so produced are out of phase with each other and thus can be discriminated from each other even if they physically overlap. Thus, physically larger recording gaps, large enough to produce adequately sized signals, may be used.

SUMMARY OF THE INVENTION

One aspect of the invention is a method of recording data on a linear medium having a servo track. A head having parallel read and write head gaps is maintained constant distances from the servo track, thus defining the locations of data tracks. During writing in a first data track, the head is tilted at an angle $\theta$ with respect to the servo track. During writing in a second data track, the head is tilted to the supplementary angle of $\theta$ with respect to the servo track, i.e., (180°−$\theta$). The location of the head and the angle of the head are both independently adjustable. This allows the data tracks to be very closely spaced together without loss of accurate tracking due to errors such as tape slope (in the case of recording on tape), and longitudinal tracking error. Therefore, areal recording density is increased.

Another aspect of the invention is a linear data recording system. The system comprises a linear medium having a servo track, a head having parallel read and write gaps, and first and second head servo mechanisms. The first, or coarse, servo mechanism maintains the head at first and second distances from the servo track. The second, or fine, servo head mechanism maintains the head at an azimuth angle $\theta$ to the servo track when the head is at the first distance from the servo track (and thus positioned over a first data track); it also maintains the head at the supplementary angle to the servo track when the head is at the second distance (and thus positioned over a second data track immediately adjacent the first data track).

A third aspect of the invention is a linear data recording medium comprising at least one servo track and at least two data tracks immediately adjacent to each other. As just described, data is recorded on the immediately adjacent data tracks at supplementary angles measured relative to the servo track.

DETAILED DESCRIPTION

Figure 1:
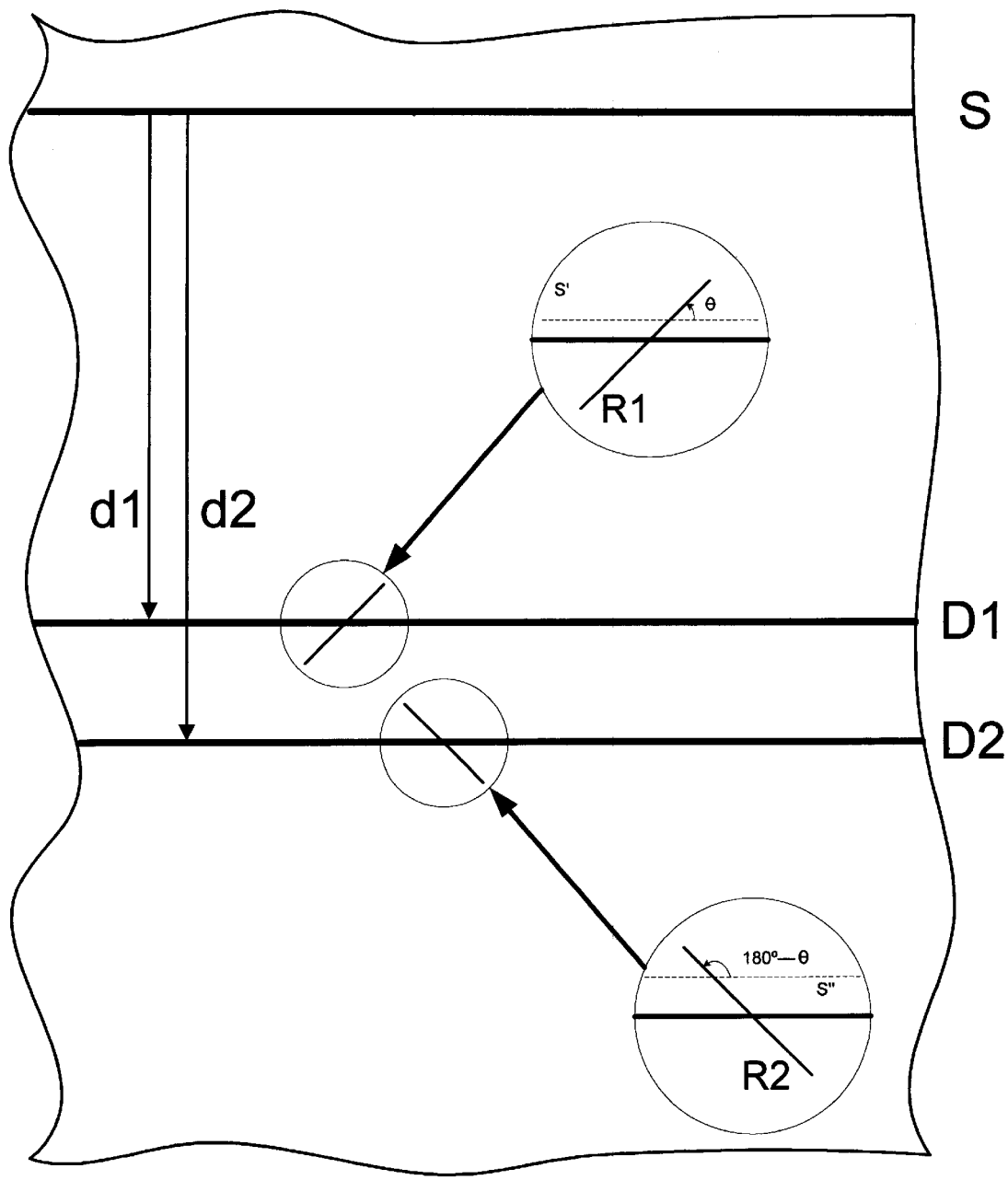
FIG. 1 is a schematic view of servo and data tracks on a linear recording medium in accordance with the various aspects of the invention.

FIG. 1 is a schematic view of a portion of a linear magnetic recording medium. The medium is preferably flexible magnetic tape, but the principles of the invention are applicable to other types of linear recording media. Servo track S and data tracks D1 and D2 are written on the medium according to conventional magnetic recording techniques. For convenience of illustration, servo track S and data tracks D1 and D2 are shown as lines without appreciable width, because in a typical application of the invention the track widths are very small on the scale of FIG. 1. However, in practical application of the invention, data tracks D1 and D2 are immediately adjacent to each other without any other data tracks between them, such that the second written track, for example D2, "trims" the width of D1, as is well known from the art of helical scan recording, thus producing tracks with essentially no non-recorded area between them.

Data recording tracks D1 and D2 lie at respective distances d1 and d2 from servo track S. As is known in the art, errors due to track mis-registration and tape slope will introduce small but important variations in distances d1 and d2 over the entire length of the recording medium when individual tracks are recorded. This is especially the case in serpentine linear tape recording, in which adjacent tracks are written while the tape is traveling in opposite directions from track to track. Thus, as the recording medium moves across head assembly H during the writing of tracks D1 and D2, variations in the actual location of the servo track on the recording medium produce variations in the effective width of the written tracks, i.e., there is "overtrimming" or "undertrimming" of the tracks.

Recorded signals R1 and R2 lie along data recording tracks D1 and D2, respectively. In accordance with the principles of azimuth recording, each recorded signal R1 and R2 lies at an angle, but as emphasized by translated lines S' and S" (which are for purposes of illustration only, and are parallel to the servo track but not necessarily parallel to the data recording track direction), the azimuth angle is measured with respect to servo track S, instead of with respect to the direction of the data recording tracks or some other reference point. Thus, recorded signal S1 lies at azimuth angle $\theta$ and recorded signal S2 lies at the supplementary angle, (180°−$\theta$). Such signals are out of phase with each other, and therefore the signals may be discriminated from each other despite their close proximity to each other in adjacent tracks, even if a track has been "undertrimmed."

Figure 2:
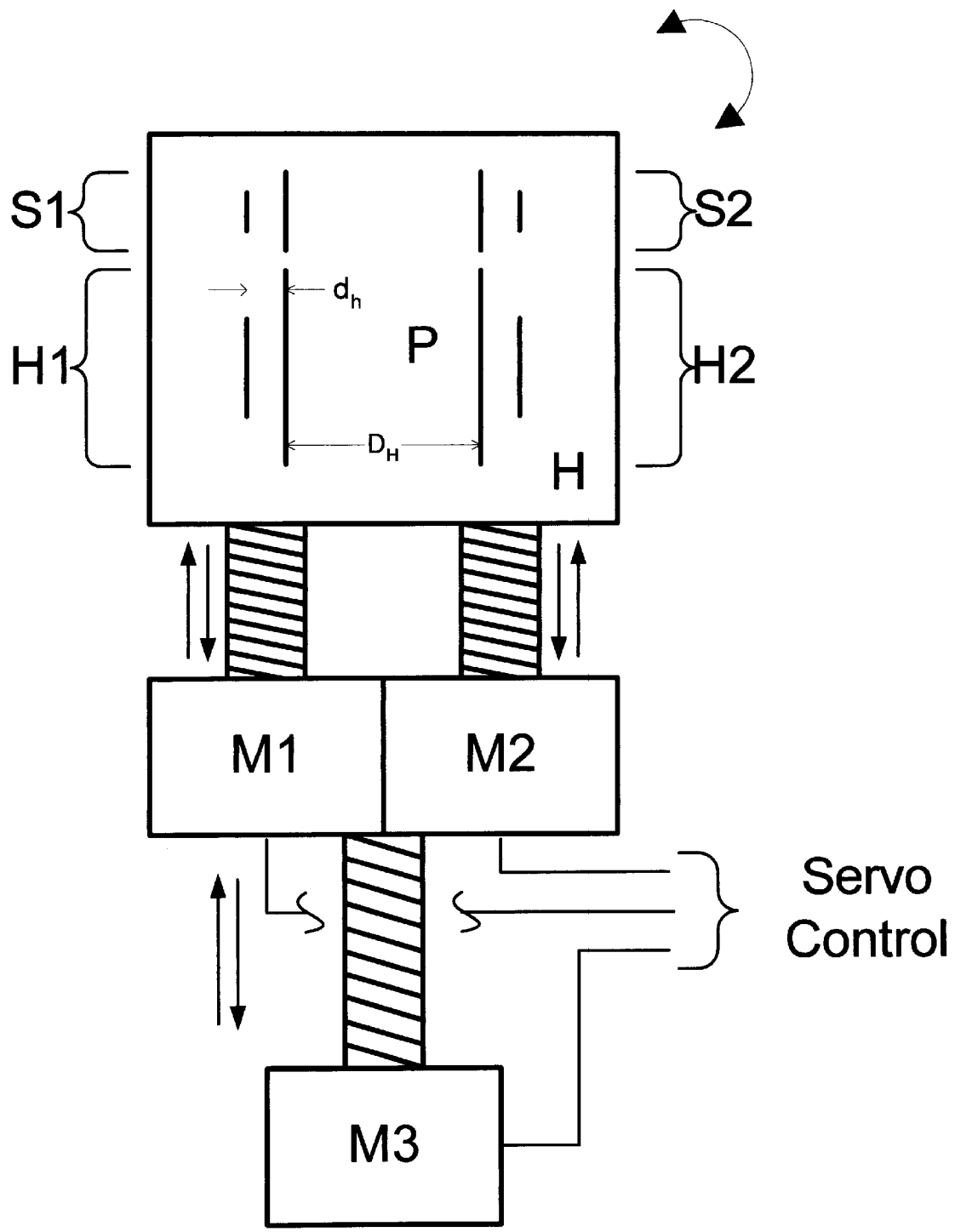
FIG. 2 is a schematic view of a data recording system in accordance with the various aspects of the invention.

FIG. 2 is a schematic view of a data recording head system capable of reading and writing the data recording signals of FIG. 1. FIG. 2 illustrates the system as seen by the recording medium (not shown), i.e., the viewer of FIG. 2 is looking up out of the plane of the recording medium; the recording medium moves to the left and right of FIG. 2.

The system comprises head assembly H, which may be any type of recording head known in the art. As shown, head assembly H comprises a pair of multi-gap servo heads S1 and S2, each of which is associated with respective dual multi-gap recording heads H1 and H2, all of which may be used together to provide dual-direction "read while write" operation as is known in the art. It should be emphasized that this is only a preferred embodiment and not a requirement of the invention. The invention will be discussed below in the context of this embodiment with the understanding that the principles and scope of the invention apply to a single head embodiment also.

Each recording gap is nominally arranged vertically, i.e., perpendicular to the direction of recording medium travel, and therefore the gaps are essentially parallel to each other. Since the process of actual magnetic data recording performed by servo and recording heads S1, S2, H1 and H2 is conventional, for convenience of illustration the circuitry employed to produce the magnetic signals is not shown.

Head assembly H is movably oriented by at least one independently controlled azimuth servo motor. As shown, independently controlled azimuth servo motors M1 and M2 are employed, but this is only a preferred embodiment and not a requirement of the invention. The invention will be discussed below in the context of this embodiment with the understanding that the principles and scope of the invention also apply to an embodiment using a single azimuth servo motor.

The entire subassembly of head assembly H and azimuth servo motors M1 and M2 is movably supported by a single independently controlled track servo motor, M3. Conventional servo control circuits (not shown) use conventional techniques to respond to signals generated by the servo track of the recording medium (not shown) to adjust motor M3 and therefore position recording head H. Specifically, motor M3 positions head assembly H about point P such that recording heads H1 and H2 are located over their proper recording tracks, all in accordance with conventional track following servo techniques. Then, motors M1 and/or M2 are used to position recording heads H1 and/or H2 at the azimuth angle designated for that track as necessary to perform azimuth data recording (as described above).

The conventional approach to linear azimuth recording employs only a single servo motor such as M3. Then, due to a fixed constant angle between a recording head such as H1 or H2 and the head assembly (i.e., each head is not perpendicular to the direction of medium travel), motion of the medium produces a recorded signal at an angle to the track direction. However, this angle is constant only with respect to the desired or intended direction of tape travel, and not with respect to the actual direction of the servo track on the medium. This situation is not a significant problem when azimuth recording is performed in a helical scan tape recording system. In that case, the tape speeds are relatively slow. Thus, even if immediately adjacent tracks are not perfectly straight, they nonetheless remain essentially parallel to each other because whatever effect has created the track location error, the effect does not change significantly from track to track. However, in linear recording, and especially in serpentine tape recording, immediately adjacent tracks in a given region of the medium are not recorded immediately before or after each other. Thus, any error in track location introduced by the servo track is a significant problem. Thus, conventional principles of azimuth recording as applied to helical scan systems are not suited to maintain the azimuth angle $\theta$ or $-\theta$ with respect to the servo track in linear recording.

The azimuth angles could be any convenient value. Typical values are of the order of magnitude of 5° and 175°, but the value of the angle is not critical to the scope of the invention. In fact, in the dual head configuration shown, the value of the azimuth angle is related to parameters such as the head gap distance $d_h$, the inter-head distance $D_H$, the track width, etc., all in accordance with known principles. Other embodiments of the invention would have different ranges of preferred azimuth angles depending on the geometry involved, again following principles known in the art.

Motors M1, M2 and M3 could be any suitable type of motor, including (without limitation) paired piezoelectric elements, voice coil motors, stepper motors, and the like.

The description above implies a certain sequence of events or procedures to implement the method aspect of the invention. Such order is for convenience of explanation only; the scope of the invention includes other sequences that achieve the functions of the invention. For example, it is possible to adjust the angle of a recording head before, during, or after the movement of that head to an adjacent track. Therefore, it should not be assumed that a discussion of steps in the above description or the following claims is a mandatory feature of the invention, unless an order is specifically stated, or necessarily dictated by the context of the steps.

I claim:

1. A method of recording data on a linear medium having a servo track, comprising:
   (a) providing a head having at least one head gap;
   (b) maintaining the head a constant first distance from the servo track;
   (c) tilting the head at an azimuth angle with respect to the servo track;
   (d) creating a first data track on the linear medium by writing data with the head gap;
   (e) moving the head to a constant second distance from the servo track;
   (f) tilting the head to the supplement of the azimuth angle with respect to the servo track; and
   (g) creating a second data track immediately, adjacent the first data track, on the linear medium by writing data with the head gap.

2. The method of claim 1, wherein the head is tilted to the supplement of the azimuth angle after writing of the first data track but before moving the head to the constant second distance.

3. The method of claim 1, wherein the head is tilted to the supplement of the azimuth angle during movement of the head to the constant second distance.

4. The method of claim 1, wherein the head is tilted to the supplement of the azimuth angle after moving the head to the constant second distance but before writing of the second data track.

5. The method of claim 1, wherein the linear data recording medium is tape.

6. A linear data recording system, comprising:
   (a) a linear data recording medium having a servo track;
   (b) a head having at least one set of parallel read and write gaps;
   (c) a first head servo mechanism for maintaining the head at first and second distances from the servo track; and
   (d) a second independently controlled servo head mechanism for maintaining the head at an azimuth angle $\theta$ to the servo track when the head is at the first distance from the servo track and thus positioned over a first data track, and at the supplement of the azimuth angle $\theta$ to the servo track when the head is at the second distance and thus positioned over a second data track immediately adjacent the first data track.

7. The system of claim 6, wherein any head servo mechanism comprises a motor chosen from the group consisting of paired piezoelectric elements, voice coil motors, and stepper motors.

8. The system of claim 6, wherein the second head servo mechanism comprises two independently controlled motors.

9. The system of claim 6, wherein the linear data recording medium is tape.

* * * * *